No. 641,929. Patented Jan. 23, 1900.
C. F. BOYCE.
MITER BOX.
(Application filed May 12, 1899.)
(No Model.)
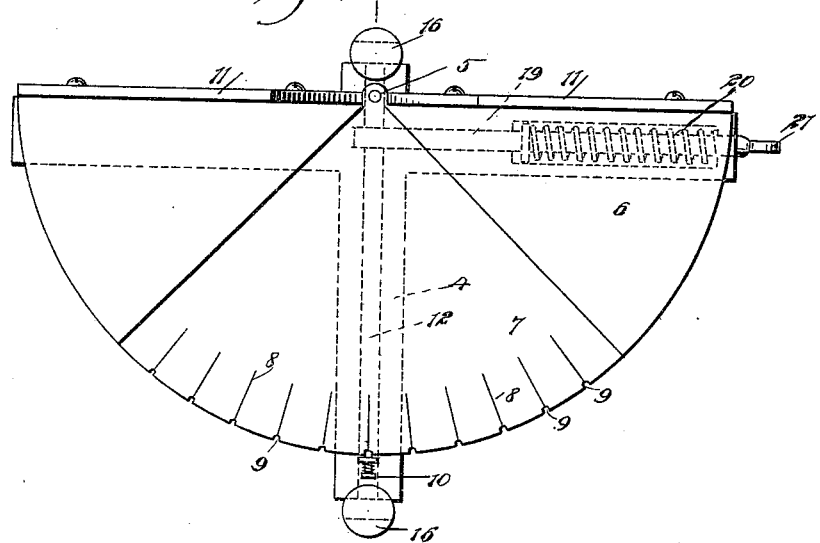
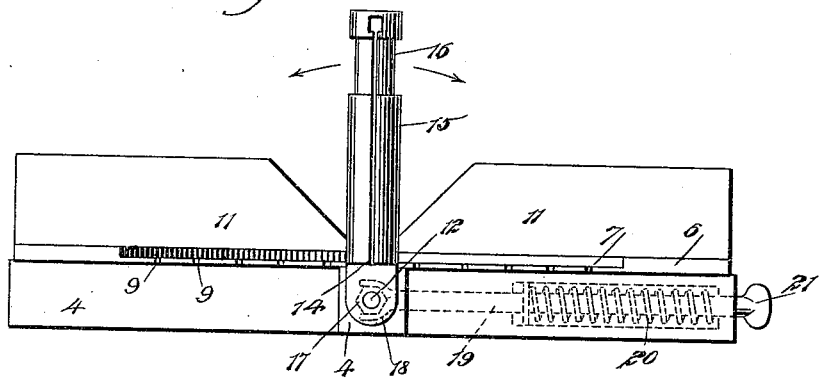
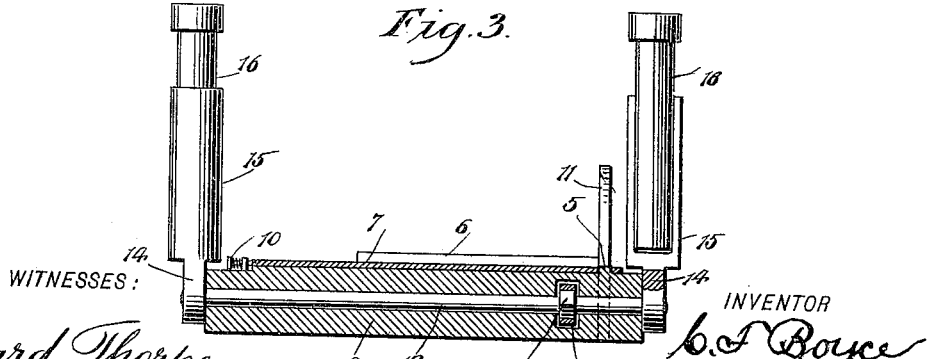
WITNESSES:
Edward Thorpe
Jesse B. Owens
INVENTOR
C. F. Boyce
BY
ATTORNEYS

UNITED STATES PATENT OFFICE.

CHARLES FRANCIS BOYCE, OF MALDEN, MASSACHUSETTS, ASSIGNOR OF ONE-HALF TO JOHN N. MAYO, OF SAME PLACE.

MITER-BOX.

SPECIFICATION forming part of Letters Patent No. 641,929, dated January 23, 1900.

Application filed May 12, 1899. Serial No. 716,557. (No model.)

*To all whom it may concern:*

Be it known that I, CHARLES FRANCIS BOYCE, of Malden, in the county of Middlesex and State of Massachusetts, have invented a new and Improved Miter-Box, of which the following is a full, clear, and exact description.

The object of this invention is to provide a miter-box which may be readily adjusted to a great number of angles and also set the saw to cut two bevels at the same time.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a rear elevation thereof, and Fig. 3 is a section on the line 3 3 of Fig. 1.

The miter-box has a T-shaped base or frame 4, having a rigid pin 5 projecting up therefrom at the front of the frame midway its length. On this pin is mounted to swing the semicircular table 6, which is formed with a segmental depression 7 therein, providing room for the teeth of the saw to avoid striking the saw against the table 6. The rear edge of the table, at the depressed portion 7, is provided with a scale or graduations 8, showing the various adjustments, and the edge of the table is formed with notches 9, adapted to be engaged by a spring-pressed dog 10, carried at the rear extremity of the frame 4, so as to hold the table adjusted as desired. The front edge of the table is provided with upwardly-extending flanges 11, against which the work should be held. By adjusting the table and fastening the same by the dog 10 any desired bevel in the face of the work may be secured.

Extending longitudinally through the frame is a rock-shaft 12, the ends of which project beyond the respective ends of the frame and have fixed connection with the lugs 14 of the saw-guides. These saw-guides consist of two telescopic sections 15 and 16, the latter sliding in the former and both being slotted longitudinally, as shown best in Fig. 2. The saw should be passed through the slots of the saw-holders, so as to be guided thereby, and the upper telescopic section 16, bearing down on the saw, will keep the same pressed upon the work. The said guides may be swung with the shaft 12 to hold the saw diagonally for forming a second bevel in the edge of the work. By adjusting the table 6 on its pivot 5 the work may be held for the formation of one bevel across the face of the work, and by swinging the saw-holders, with the shaft 12, on a horizontal axis the saw may be held diagonally to cut a second bevel in the edge of the work, both of which operations are simultaneous.

For the purpose of holding the shaft 12 at the proper adjustment I fasten to the shaft an angular collar 17, which is adapted to be engaged by a fork 18, formed on a rod 19, extending transversely of the frame and through a part thereof. The rod 19 is movable longitudinally toward and from the collar 17 and is pressed toward the collar by an expansive spring 20. The rod is also provided with a finger-piece 21 for the purpose of drawing out the rod 19 to disengage the rod from the shaft and permit the shaft to be turned.

Having thus described my invention, I claim as new and desire to secure by Letters Patent—

1. In a miter-box, the combination of a T-shaped base, a rigid pin projecting upward therefrom at the front of the base midway its length, a semicircular table mounted to swing on such pin over the top of the base, the pin being central to the edge of the table, a spring-dog mounted on the base and serving to engage the edge of the table to hold the table, a rock-shaft extending through the frame beneath the table, saw-guides mounted respectively at the ends of the rock-shaft and swinging therewith, an angular collar fastened to the shaft, and a spring-pressed rod serving to engage said collar to hold the rock-shaft at any desired axial position.

2. In a miter-box, the combination of a base, a table mounted to move thereon, means for holding the table at the desired adjustment, a rock-shaft mounted in the frame below the table, saw-guides carried respectively at the ends of the rock-shaft, an angular collar attached to the rock-shaft, and a spring-pressed rod having a forked end, the fork serving to engage the angular collar of the rock-shaft to hold the rock-shaft.

3. The combination with a base, of a semicircular table mounted to swing thereon, of an axis central to the edge of the table, a spring-pressed dog carried by the base and engaging the edge of the table opposite the axis thereof to hold the table at the desired adjustment, the table being formed with a segmental depression in the top thereof to provide room for the teeth of the saw, upwardly-extended flanges attached to the front edge of the table, the flanges being separated at the pivot of the table to permit the passage of the saw, and means for guiding the saw, such means being supported on the base.

4. In a miter-box, the combination of a base, a work-table adjustable thereon, a rock-shaft mounted in the base, a saw-guide carried by the rock-shaft, and a spring-pressed rod having a portion serving to engage with a part of the rock-shaft to hold the rock-shaft at the desired adjustment.

CHARLES FRANCIS BOYCE.

Witnesses:
 EDWARD A. ADAMS,
 BENJ. F. ADAMS.